United States Patent [19]
Frieden et al.

[11] Patent Number: 4,632,650
[45] Date of Patent: Dec. 30, 1986

[54] VACUUM PUMP HAVING AN EVACUATED GEAR CHAMBER

[75] Inventors: Peter Frieden; Hans-Peter Kabelitz, both of Cologne; Karl-Heinz Ronthaler, Zülpich; Jörg Thielicke, Cologne, all of Fed. Rep. of Germany

[73] Assignee: Leybold-Heraeus GmbH, Cologne, Fed. Rep. of Germany

[21] Appl. No.: 680,914

[22] Filed: Dec. 12, 1984

[30] Foreign Application Priority Data

Dec. 13, 1983 [DE] Fed. Rep. of Germany ....... 3344953

[51] Int. Cl.$^4$ .................. F04C 18/18; F04C 29/02; B01D 46/00; F16J 15/447
[52] U.S. Cl. ........................................ 418/95; 418/96; 418/104; 418/206; 55/185; 55/195; 277/3; 277/15; 277/17; 277/24
[58] Field of Search................... 418/95, 96, 104, 205, 418/206, 141; 277/3, 15, 17, 24; 55/185, 195; 74/606 R

[56] References Cited

U.S. PATENT DOCUMENTS

| 1,696,882 | 12/1928 | Hassler | 418/95 |
| 2,064,703 | 12/1936 | Van de Graaff | 277/3 |
| 3,071,384 | 1/1963 | Friberg | 277/3 |
| 3,131,939 | 5/1964 | Cuny | 277/15 |
| 3,360,192 | 12/1967 | Van Hees | 418/95 |
| 3,489,034 | 1/1970 | Moore | 74/606 |
| 4,084,944 | 4/1978 | Chirico | 55/185 |

FOREIGN PATENT DOCUMENTS

| 1939717 | 11/1978 | Fed. Rep. of Germany . | |
| 2725299 | 12/1978 | Fed. Rep. of Germany . | |
| 3047699 | 7/1982 | Fed. Rep. of Germany . | |
| 3216990 | 11/1983 | Fed. Rep. of Germany . | |
| 445709 | 2/1968 | Switzerland . | |
| 241169 | 8/1969 | U.S.S.R. | 277/3 |

Primary Examiner—John J. Vrablik
Attorney, Agent, or Firm—Spencer & Frank

[57] ABSTRACT

A vacuum pump includes an evacuation chamber, a gear chamber, a partition separating the evacuation chamber from the gear chamber, a rotary pump shaft extending through the partition and having one end connected to a vane arranged for rotation in the evacuation chamber and having another, opposite end extending into the gear chamber, a shaft bearing surrounding the pump shaft and received in the partition, a labyrinth seal surrounding the pump shaft and received in the partition for sealing the evacuation chamber from the gear chamber, an oil sump defined in the gear chamber for accommodating oil therein, an evacuation device for generating a vacuum in the gear chamber and an oil loss preventing arrangement for avoiding an oil deficiency in the gear chamber due to the vacuum generated therein.

18 Claims, 8 Drawing Figures

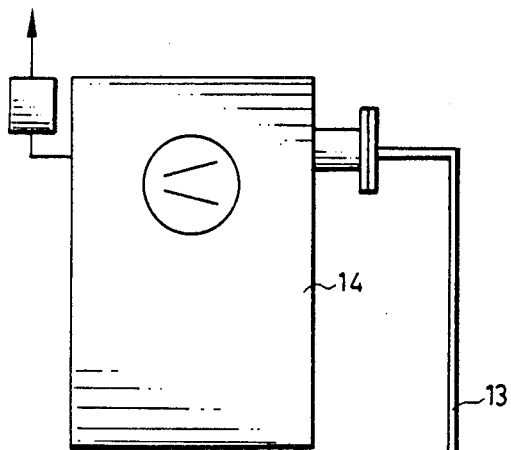
FIG.1
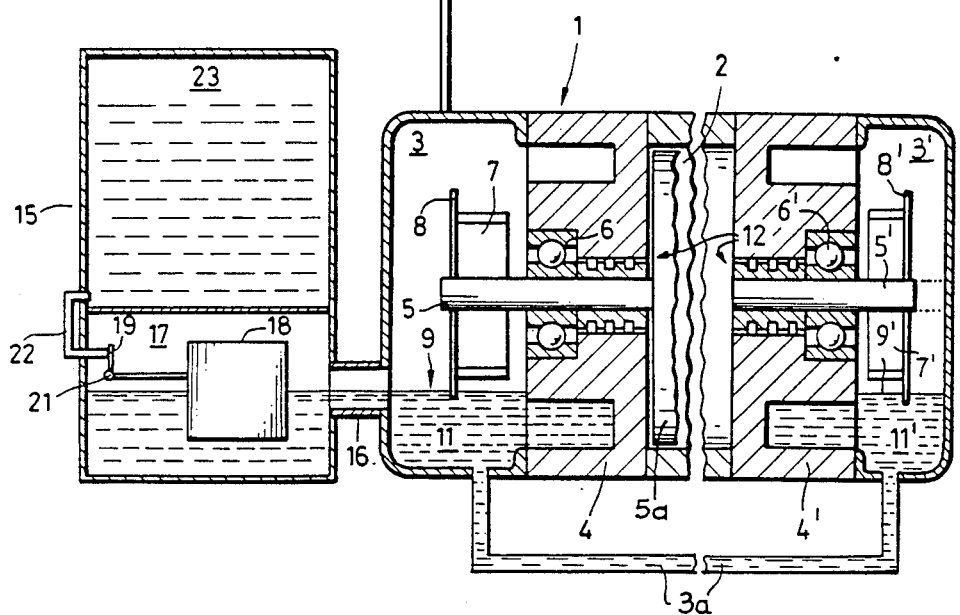

VACUUM PUMP HAVING AN EVACUATED GEAR CHAMBER

BACKGROUND OF THE INVENTION

This invention relates to a vacuum pump, such as a two-shaft vacuum pump which has an evacuation chamber and, arranged laterally thereto, has at least one oil containing gear chamber which is coupled with an evacuating device and further has a partition situated between the evacuation chamber and the gear chamber. The partition supports bearings for the shafts of the lobe-like rotary impellers situated in the evacuation chamber and labyrinth seals which are situated between the evacuation chamber and the gear chamber and which cooperate with the shafts passing through the partition.

A two-shaft vacuum pump is typically represented by a rotary blower pump (Roats pump) such as disclosed, for example in German Patent No. 1,939,717. It comprises an evacuation chamber in which cooperating lobe-like impellers rotate in rolling contact with one another. In lateral partitions the shafts of the impellers are supported such that they project into laterally adjacent gear chambers where the shafts carry meshing gears which ensure the correct position of the impellers with respect to one another. One of the shafts is coupled with the shaft of a drive motor. As a rule, rotary blower pumps of this type are provided with two gear chambers, but in case of a floating support of the impellers, only a single gear chamber is needed.

The gear chambers which communicate with one another and which are arranged laterally of the evacuation chamber, contain oil which serves for lubricating the gears and the shaft bearings. In order to prevent oil or oil vapors from penetrating into the evacuation chamber, seals are provided on the shafts in the zone of the partitions. The seals may be oil seal rings which are disadvantageous since they are exposed to wear and thus have only a limited service life. Accordingly, instead of oil seal rings, wear-free labyrinth seals are conventionally used.

Two-shaft vacuum pumps, particularly pumps having rotary lobe-like impellers are frequently used in cases where a strictly oil-free evacuation or conveyance of gas has to be ensured. In order to meet this requirement with the simultaneous use of wear-free labyrinth seals, it has been proposed to evacuate the gear chambers to a pressure and maintain such a pressure which is less than the lowest pressure in the evacuation chamber. In this manner, in the zone of the labyrinth seal, a gas flow is generated from the evacuation chamber towards the gear chamber which prevents oil from penetrating in the opposite direction. The higher the volume flow through the labyrinth seal the better the sealing effect.

Since in the gear chambers the oil is swirled (thrown) around by means of a spraying disc in order to lubricate the gears to a sufficient extent, the evacuated gas is significantly enriched with oil. Particularly in case a high volume flow is to be obtained in the zone of the labyrinth seals by means of an evacuation of the gear chambers with a high suction capacity, the quantities of oil entrained from the gear chamber may be large enough to cause the oil level to drop below a minimum limit value. As a result, a satisfactory lubrication of the gears and bearings is no longer ensured.

SUMMARY OF THE INVENTION

It is an object of the invention to provide an improved vacuum pump of the above-outlined type, in particular, a two-shaft vacuum pump operating with gear chamber evacuation and labyrinth seals wherein, on the one hand, there is ensured a large volume flow through the labyrinth seal and, on the other hand, the danger of an impermissible oil drop in the gear chamber is eliminated.

This object and others to become apparent as the specification progresses, are accomplished by the invention, according to which, briefly stated, a mechanism is provided which ensures that oil losses in the gear chamber as a result of the gear chamber evacuation do not occur.

According to a preferred embodiment of the invention, an additional oil reservoir is associated with the gear chamber. This embodiment of the invention permits a compensation of the oil loss, resulting from the gear chamber evacuation, from the additional oil reservoir. The additional oil reservoir should be preferably large in order to achieve long time intervals between oil changes. Expediently, the supply of the oil from the oil reservoir to the gear chamber is effected by a float which maintains the oil level in the gear chamber at the required height.

According to another preferred embodiment of the invention, an oil separating element is arranged in the conduit which leads from the gear chamber to the evacuating device that maintains the gear chamber under vacuum. According to a further development of this solution, the oil collecting chamber of the oil separating element is connected with the gear chamber for the purpose of returning the separated oil, preferably by means of a float-type regulator. According to this embodiment, the oil drawn away as a result of the gear chamber evacuation is separated in the oil separator and returned to the gear chamber.

According to a further preferred embodiment of the invention, an oil-sealed vacuum pump is used as the evacuating device for the gear chamber and the latter is connected with the oil reservoir of the oil-sealed vacuum pump. The oil entrained from the gear chamber of the rotary blower pump is admitted into the oil reservoir of the oil-sealed pump and is returned therefrom into the gear chamber.

According to still another preferred embodiment of the invention, in the separating wall between the bearings and the labyrinth seals there is arranged an oil steadying chamber and the vacuum pump which serves for the evacuation of the gear chamber is coupled to the steadying chamber. These measures by themselves provide that only a very small amount of the oil vapors are admitted from the gear chamber to the vacuum pump while the directed flow in the labyrinth seals may be reliably maintained. If additional measures according to the earlier-described features are taken, the danger of an oil scarcity in the gear chamber is entirely eliminated.

BRIEF DESCRIPTION OF THE DRAWINGS

FIG. 1 is a schematic sectional side elevational view of a preferred embodiment of the invention.

FIG. 2a is a view similar to FIG. 2, illustrating a modification of the construction shown therein.

FIG. 3a is a modified sectional elevational detail of FIG. 3.

DESCRIPTION OF THE PREFERRED EMBODIMENTS

Figure 2:
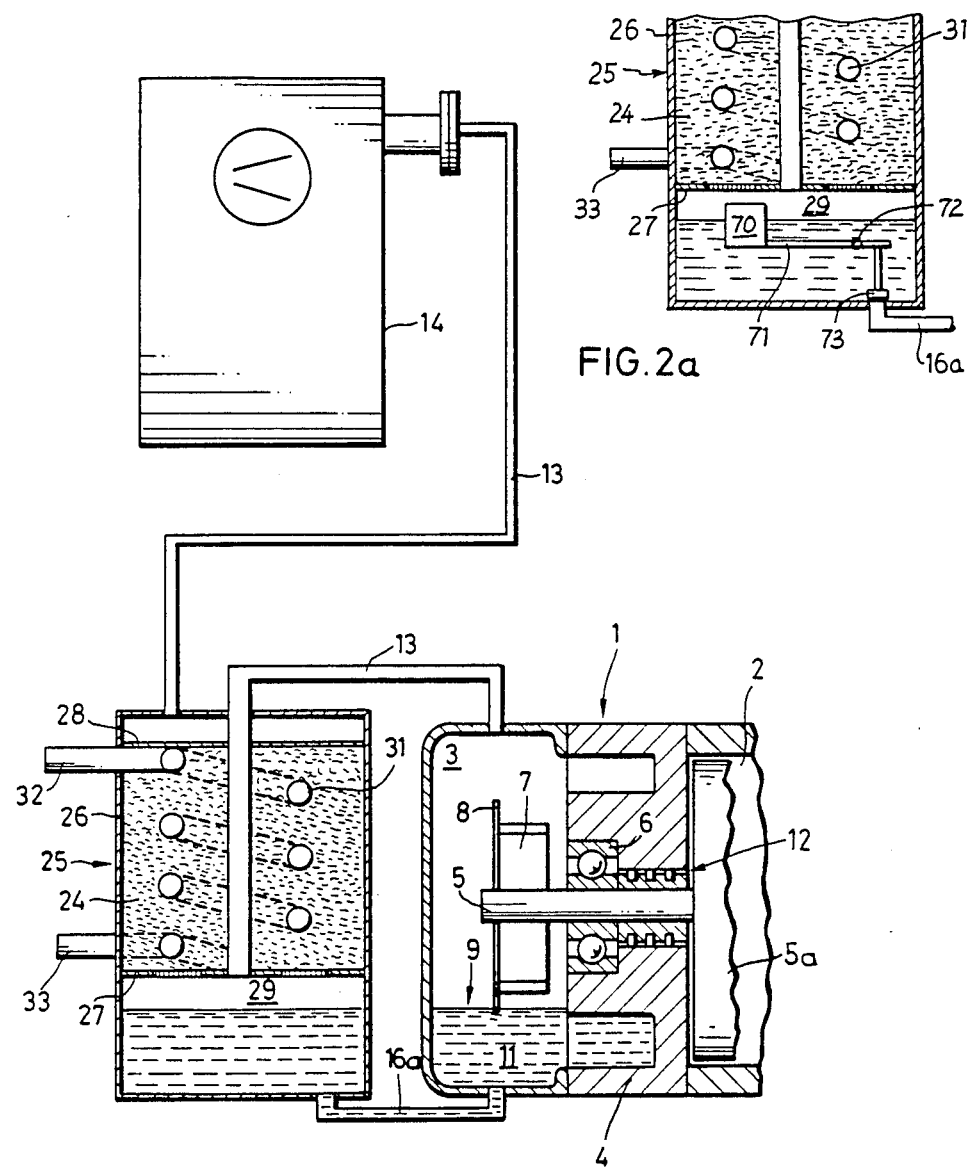
FIG. 2 is a schematic sectional side elevational view of another preferred embodiment of the invention.

In all the FIGS. 1 through 6 there is illustrated a portion of a rotary blower pump having rotating lobe-like impellers engaging one another with a rolling contact. The rotary blower pump 1 has an evacuation chamber 2 and a gear chamber 3 separated from one another by a partition 4 in which stub shafts 5 of the lobe-like impellers 5a are supported by means of ball bearings 6. To the free end of the stub shafts 5 there are mounted gears 7 which are situated in the gear chamber 3 and which are in a conventional meshing relationship with one another (not illustrated). Further, on the shaft 5 there is mounted an oil throwing disc 8 dipping into an oil bath 11 which is accommodated in the gear chamber 3 and which has a level 9. As the throwing disc 8 rotates, the oil dispersed thereby sufficiently lubricates both the gears 7 and the bearings 6.

The shaft 5 is surrounded by a labyrinth seal 12 accommodated in the partition 4. In order to prevent oil-enriched air from penetrating into the evacuation chamber 2 from the gear chamber 3, it is known to couple the gear chamber 3 directly with a vacuum pump, such as vacuum pump 14. In this manner, in the zone of the labyrinth seal 12 there is maintained a gas flow from the evacuation chamber 2 towards the gear chamber 3 and thus a reverse flow of air enriched with oil is prevented.

In FIGS. 2 through 6, of the rotary blower pump only one stub shaft 5, one gear 7, one bearing 6 and one labyrinth seal 12 are illustrated. FIG. 1, however shows a second gear chamber 3 which is situated on the other side of the evacuation chamber 2 and which is in communication with the gear chamber 3. The gear chamber 3' by means of a connecting conduit 3a is separated from the evacuation chamber 2 by a partition 4' which accommodates a stub shaft 5' (carrying a gear 7' and an oil throwing disc 8') and bearings 6'. The oil in the gear chamber 3' and its level are designated at 11' and 9', respectively. The lobe-like impellers carried by the stub shaft 5' and cooperating with the lobe-like impellers 5a carried by the stub shaft 5 are not shown. The lobe-like impellers are driven by a conventional drive located, for example, in the gear chamber 3'. The embodiments shown in FIGS. 2-6 also have second gear chambers (not shown), similar to the gear chamber at 3' of FIG. 1.

In FIG. 1, the gear chamber 3 is connected with the vacuum pump 14 by means of a conduit 13. The vacuum pump 14 withdraws sufficient air quantities from the gear chamber 3 in order to maintain an air flow through the labyrinth seal 12 from the evacuation chamber 2 in the direction of the gear chamber 3. The entrained oil is replaced from a separate oil reservoir 15 by means of a connecting port 16. For maintaining the desired oil level 9 in the gear chamber 3, a float-type regulator is provided. For this purpose, the connecting port 16 is arranged at the height of the oil level 9 and connects the gear chamber 3 with an oil level regulating chamber 17 in which a float 18 is accommodated. The float causes pivotal motion of a schematically shown closure element 19 about a shaft 21. The closure element 19 cooperates with the opening of an oil supply conduit 22 which is in communication with an oil storage chamber 23 which forms part of the reservoir 15 and which is situated above the regulating chamber 17.

Turning now to the embodiment illustrated in FIG. 2, in the conduit which leads from the gear chamber 3 to the vacuum pump 14 there is connected an oil separating unit 25. The latter comprises a housing 26 which is, between two gas-pervious bottoms 27 and 28, filled with a filtering material (preferably metal wool) 24. The air enriched with oil is drawn through the filter material 24 towards the vacuum pump 14. The oil separated in the filter material 24 is admitted to the oil collecting chamber 29 situated underneath the filter 24. From the oil collecting chamber 29 the oil is returned to the gear chamber 3 through a connecting conduit 16a. The conduit 16a is so arranged that the oil is returned into the oil sump of the rotary blower pump 1. A float-type level regulation in this embodiment is not necessary because an impermissible rise in the oil level 9 in the gear chamber 3 by external oil cannot occur. The arrangement merely has to ensure that the oil separated in the filter material 24 is returned to the gear chamber 3. It is nevertheless feasible to equip the FIG. 2 construction with a float essentially in a manner shown and described in connection with the embodiment illustrated in FIG. 1. Thus, as shown in FIG. 2a, a float 70 is accommodated in the oil collecting chamber 29 and has an arm 71 pivotal about a pin 72. A plug 73, mounted on the arm 71, controls the opening of the connecting conduit 16a as a function of the height position of the float 70. For improving the separation of the oil, a water cooling system may be associated with the filter 24. Such a water cooling arrangement may comprise, for example, a tube coil 31 which is embedded into the filter 24 and in which cooling water circulates. Inlet and outlet nipples of the coil 31 are designated at 32 and 33 respectively.

The embodiment according to FIG. 2 permits a coarse separation of the entrained oil. A separating effect is, to be sure, improved by the baffle effect by virtue of the water cooling; a complete separation of the entrained oil vapors is, however, not feasible.

Figure 3:
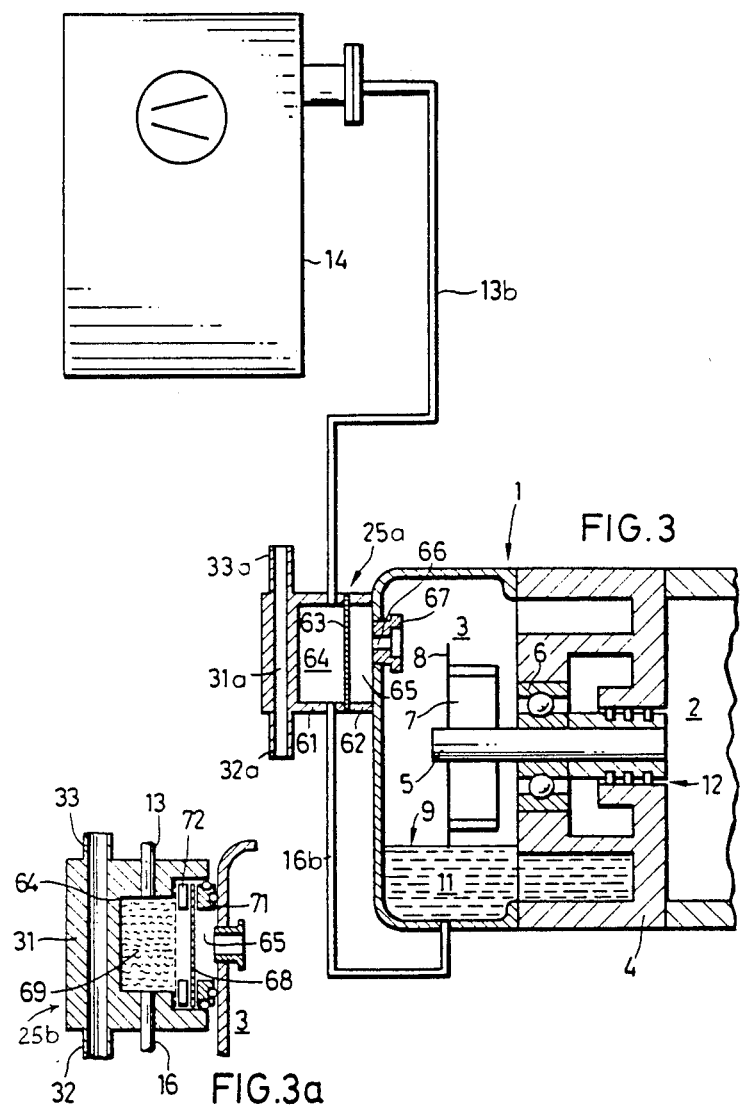
FIG. 3 is a schematic sectional side elevational view of still another preferred embodiment of the invention.

Turning now to the embodiment illustrated in FIG. 3, there is provided an oil separating unit 25a which is, as an attachment, secured directly to the gear chamber 3 above the oil level 9. The oil separating unit 25a includes a casing formed of a cap 61 and an annular portion 62. Between these two components there is tensioned a multi-layer wire web 63. In this manner, in the oil separating unit 25a there are obtained two chambers 64 and 65. The chamber 65 is directly connected with the gear chamber 3 by means of a bore 66. The latter is provided, on its side oriented towards the gear chamber 3, with a collar 67 which protects the bore 66 against oil thrown by the disc 8. To the chamber 64 there is connected a conduit 13b which leads to the vacuum pump 14. In the lower zone, to the chamber 64 there is connected an oil return conduit 16b which opens into the oil sump 11. For improving the oil separating effect, the cap 61 is provided with a water cooling device 31a. The water inlet and outlet are designated at 32a and 33a respectively. The cap 61 is made expediently from a highly heat conductive material such as aluminum to ensure that the wire web 63 also assumes a low temperature. The annular portion 62 of the oil separating unit 25a is formed expediently of a material of poor heat conducting properties to prevent a heat transfer from the pump housing to the wire web 63.

FIG. 3a shows a variant of the embodiment illustrated in FIG. 3. There is shown therein an oil separating unit 25b which effects a stepped oil separation with two serially arranged oil separating elements 68 and 69. The first separating stage forms a droplet filter 68 composed of a plurality of metal web layers (preferably of high grade steel) having a mesh width of approximately 50 micron. The filter 68 is—in contradistinction to the construction shown in FIG. 3—connected in a heat conducting manner by a metal ring 71 with the housing of the gear chamber 3 to prevent an excessive viscosity of the oil in the web filter to thus ensure that the oil does not clog the filter 68. In the chamber 65 adjoining downstream the filter 68 there is accommodated a metal wool mass 69 which functions as an oil vapor separator whose effect is increased by a cooling arrangement 31. A filter element positioning ring 72 which engages the filter 68 is formed of a poor heat conductor so that cold losses remain small and a cooling of the web filter 68 is thus prevented.

Figure 4:
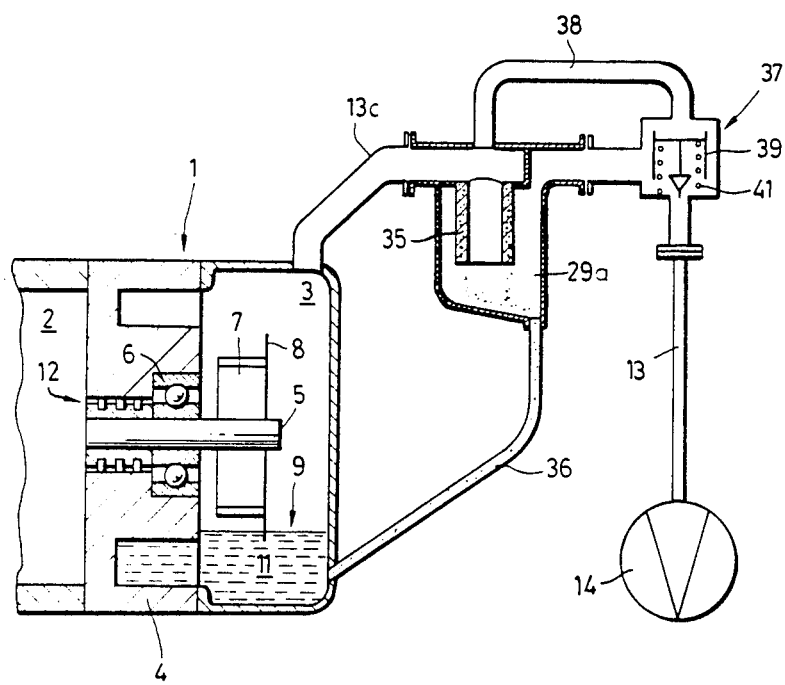
FIG. 4 is a schematic sectional side elevational view of a further embodiment of the invention.

Turning now to FIG. 4, a significant improvement of the oil separation is achieved by inserting an oil vapor filter 35 into the conduit 13c leading from the gear chamber 3 to the vacuum pump 14. The oil vapor filter 35 may be a filter cartridge in which the material to be filtered flows from the inside outwardly and whose filter material is, for example, glass fibers with epoxy resin. The arrangement according to FIG. 4 results in a substantially complete separation and return of the entrained oil so that risks of insufficiency of oil in the gear chamber 3 are securely avoided. Since the filter elements having fine oil separating characteristics have a flow resistance, during operation, in the oil collecting chamber 29a a pressure ps prevails which is smaller than the pressure pg in the gear chamber 3. Accordingly, particular measures have to be taken which ensure that the separated oil returns from the oil collecting chamber 29a into the gear chamber 3 through a return conduit 36. Such a return flow is ensured by connecting the return conduit 36 with the gear chamber 3 underneath the oil level 9 and by selecting the height position of the oil collecting chamber 29a with respect to the oil level 9 in the gear chamber 3 such that the pressure difference pg−ps which builds up due to the flow resistance of the oil filter 35 is smaller than the barometric delivery pressure difference which depends from the height of the oil collecting chamber 29a above the oil level 9. In case of an inverse pressure relationship (that is, ps is greater than pg) oil would be drawn from the gear chamber 3 into the oil collecting chamber 29a and the oil level 9 would drop to an impermissible extent in the gear chamber 3.

In order to ensure that the pressure difference between the pressure pg in the gear chamber 3 and the pressure ps in the oil collecting chamber 29a remains between limited values, it is expedient to connect a pressure regulating valve 37 downstream of the oil vapor filter 35. An actuating piston 39 of the pressure regulating valve 37 is exposed on the one side to the pressure pg of the gear chamber 3 (admitted thereto by a conduit 38) and is exposed on the other side to the pressure ps which prevails in the oil collecting chamber 29a. Further, the actuating piston 39 is biased by a spring 41 which compensates for the weight of the piston and determines the extent of the open position of the valve as a function of the pressure difference.

A pressure regulating valve 37 structured in the above-outlined manner provides that with good approximation a constant pressure difference will build up across the oil filter 35. Since through the oil vapor filters as a rule laminar flows occur, the pressure difference which builds up across the filter is proportional to the volume flow. Thus, there is achieved by means of the above-described regulation of the pressure difference simultaneously a regulation of the volume flow in a sense that the volume flow is also maintained at least approximately constant.

Figure 5:
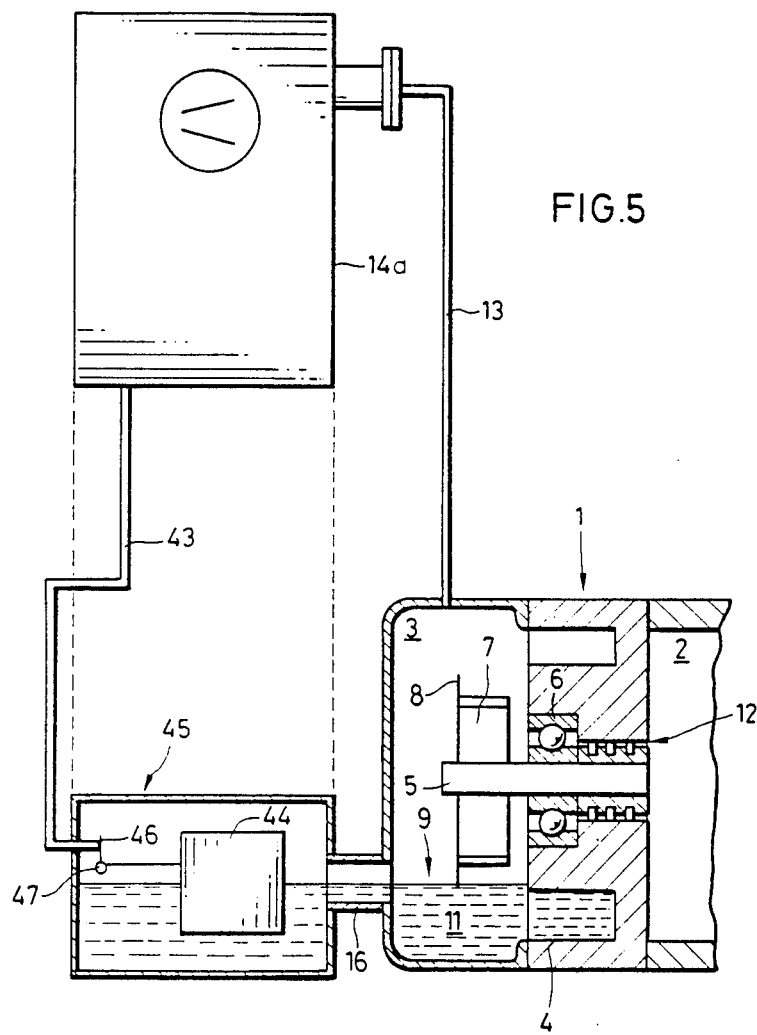
FIG. 5 is a schematic sectional side elevational view of a further embodiment of the invention.

Turning now to the embodiment illustrated in FIG. 5, the vacuum pump 14a which serves to evacuate the gear chamber 3 through the conduit 13 is an oil-sealed vacuum pump including an oil reservoir and equipped with an exhaust filter (not shown). The oil entrained from the gear chamber 3 is introduced into the oil reservoir of the vacuum pump 14a. Therefrom the oil is returned through a conduit 43 to a vessel 45 which communicates with the gear chamber 3 by means of a port 16. The vessel 45 and the port 16 are arranged at the height of the oil level 9 in the gear chamber 3. An oil level regulation is effected—as in the FIG. 1 embodiment—by means of a float 44 which is pivotal about an axis 47 with its closure member 46. The latter regulates the oil admission from the opening of the oil supply conduit 43.

The oil supply conduit 43 and the additional vessel 45 may be omitted provided that the vacuum pump 14a is arranged in such a manner adjacent the rotary blower pump 1 that the desired oil levels are maintained at the same height in both pumps.

Oil-seal vacuum pumps—such as vacuum pump 14a—may be provided with high-efficiency exhaust filters which prevent oil from escaping from the system. In this manner it may be ensured that the oil entrained from the gear chamber 3 is returned thereto.

Figure 6:
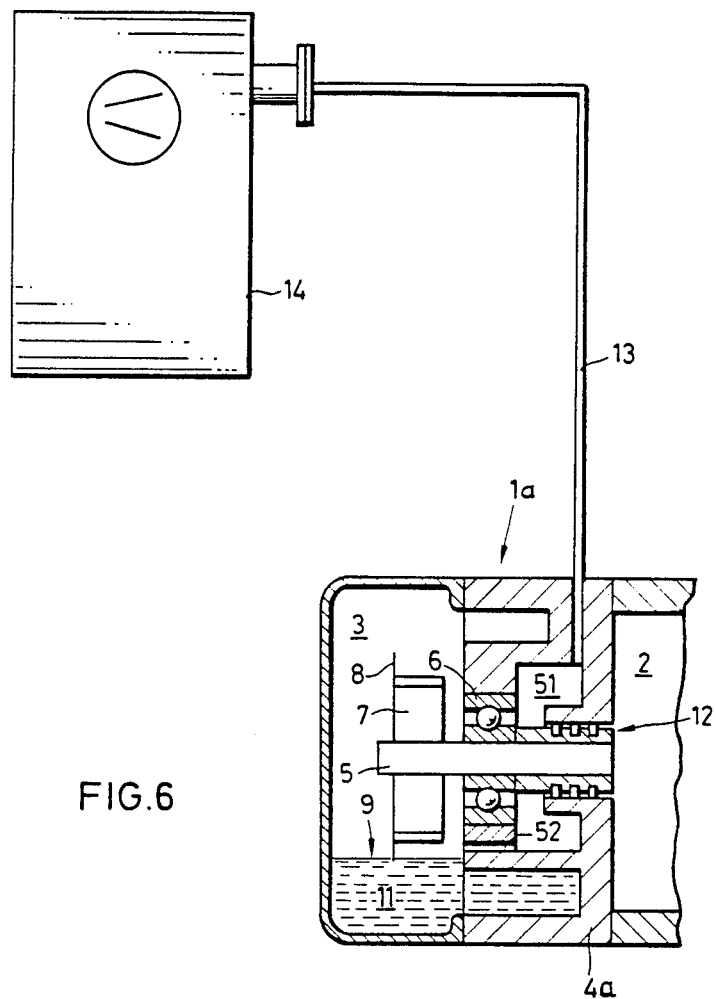
FIG. 6 is a schematic sectional side elevational view of a further embodiment of the invention.

Turning now to the embodiment illustrated in FIG. 6, there is shown a specially structured two-shaft vacuum pump 1a in which in the partition 4a between the bearing 6 and the labyrinth seal 12 an oil-steadying chamber 51 is arranged which is connected by means of at least one oil return channel 52 with the gear chamber 3. To the oil-steadying chamber 51 there is connected the conduit 13 leading to the vacuum pump 14. Into the oil-steadying chamber 51 there will only penetrate vapors which are but weakly charged with oil, so that evacuation of the gear chamber 3 with the use of the steadying chamber 51 is alone sufficient to lead to a significant lowering of the oil consumption. The preservation of the directed flow in the zone of the labyrinth seals 12 may be improved in this embodiment as compared to the other described constructions. If the FIG. 6 embodiment is used in conjunction with any of the other constructions described before, oil losses may be completely eliminated for all practical purposes.

It will be understood that the above description of the present invention is susceptible to various modifications, changes and adaptations, and the same are intended to be comprehended within the meaning and range of equivalents of the appended claims.

What is claimed is:

1. In a vacuum pump having an evacuation chamber, a gear chamber, a partition separating said evacuation chamber from said gear chamber, a rotary pump shaft extending through said partition and having one end connected to an impeller arranged for rotation in said evacuation chamber and having another, opposite end extending into said gear chamber and connected to a gear therein, a shaft bearing surrounding said pump shaft and received in said partition, a labyrinth seal surrounding said pump shaft and received in said partition for sealing said evacuation chamber from said gear chamber, and oil sump means defined in said gear chamber accommodating oil therein; the improvement comprising (a) an auxiliary vacuum pump;
(b) a vacuum conduit maintaining communication between said gear chamber and said auxiliary vacuum pump for generating a vacuum in said gear chamber by said auxiliary vacuum pump;
(c) an oil separating element continued in said vacuum conduit for separating oil entrained by gases drawn by said auxiliary vacuum pump from said gear chamber; and
(d) a return conduit maintaining communication between said oil separating element and said oil sump means for returning oil, separated by said oil separating element, to said oil sump means.

2. A vacuum pump as defined in claim 1, wherein said gear chamber is present in a plurality; the gear chambers being in communication with one another.

3. A vacuum pump as defined in claim 1 said vacuum conduit including a suction nipple situated in said gear chamber; said suction nipple including a collar for screening said suction nipple from oil thrown in said gear chamber.

4. A vacuum pump as defined in claim 1, wherein said oil separating element comprises a filter containing metal wool.

5. A vacuum pump as defined in claim 1, wherein said oil separating element comprises an oil vapor filter.

6. A vacuum pump as defined in claim 1, further comprising a pressure regulating valve in said vacuum conduit between said oil separating element and said auxiliary vacuum pump.

7. A vacuum pump as defined in claim 1, further comprising cooling means operatively connected with said oil separating element.

8. A vacuum pump as defined in claim 7, wherein said cooling means comprises a coolant conduit for guiding cooling water therethrough.

9. A vacuum pump as defined in claim 1, wherein said oil separating element comprises a casing mounted externally of said gear chamber on a bounding wall thereof.

10. A vacuum pump as defined in claim 9, wherein said casing comprises a cap-shaped and an annular member; said oil separating element further comprising an oil filter clamped between said cap-shaped and annular members and formed of a multilayer metal mesh.

11. A vacuum pump as defined in claim 10, wherein said cap-shaped member is a good heat conductor and said annular member is a poor heat conductor; further comprising cooling means including a coolant conduit being in a heat exchanging contact with said cap-shaped member.

12. A vacuum pump as defined in claim 1, further comprising an oil collecting chamber operatively connected with said oil separating element for receiving oil therefrom and said oil collecting chamber being connected with said gear chamber for returning oil extracted by said oil separating element to said gear chamber.

13. A vacuum pump as defined in claim 12, further comprising float means for regulating return of oil from said oil collecting chamber to said gear chamber.

14. A vacuum pump as defined in claim 12, wherein said oil in said oil sump means of said gear chamber has an oil level of expected normal height; said oil collecting chamber being connected with said gear chamber by an oil return conduit opening into said gear chamber at a location situated lower than the expected normal height of the oil level, further wherein said oil collecting chamber is situated at such a height above said normal height of the oil level in said oil sump means so as to ensure a return of oil from said oil collecting chamber into said gear chamber.

15. In a vacuum pump as defined in claim 1, wherein said oil separating element is a first oil separating element; further comprising a second oil separating element contained in said vacuum conduit downstream for said first oil separating element as viewed in a direction of fluid flow in said vacuum conduit from said gear chamber to said auxiliary vacuum pump.

16. A vacuum pump as defined in claim 15, wherein said first oil separating element comprises an oil droplet filter.

17. A vacuum pump as defined in claim 15, wherein said second oil separating element comprises an oil vapor separator including a mass of metal wool.

18. A vacuum pump as defined in claim 17, further comprising cooling means for cooling said oil vapor separator.

* * * * *